US006839685B1

(12) United States Patent
Leistensnider et al.

(10) Patent No.: US 6,839,685 B1
(45) Date of Patent: Jan. 4, 2005

(54) METHOD AND SYSTEM FOR CREATING A PORTFOLIO OF STOCK EQUITIES

(75) Inventors: James Leistensnider, Wayne, PA (US); Thomas Loop, Scotch Plains, NJ (US)

(73) Assignee: Prudential Insurance Company of America, Newark, NJ (US)

( * ) Notice: Subject to any disclaimer, the term of this patent is extended or adjusted under 35 U.S.C. 154(b) by 667 days.

(21) Appl. No.: 09/182,466

(22) Filed: Oct. 30, 1998

(51) Int. Cl.[7] .............................................. G06F 17/60
(52) U.S. Cl. ............................ 705/36; 705/35; 705/37
(58) Field of Search ........................ 705/1, 10, 35–37, 705/42, 43; 235/379

(56) References Cited

U.S. PATENT DOCUMENTS

| | | | | |
|---|---|---|---|---|
| 5,297,032 A | * | 3/1994 | Trojan et al. ................... | 705/37 |
| 5,819,238 A | * | 10/1998 | Fernholz ....................... | 705/36 |
| 5,978,778 A | * | 11/1999 | O'Shaughnessy ............ | 705/36 |
| 6,064,985 A | * | 5/2000 | Anderson ..................... | 706/36 |

FOREIGN PATENT DOCUMENTS

WO    WO009844444 A1 * 10/1998

OTHER PUBLICATIONS

Equity income, "Does it Pay to go for yield in selecting stocks? It hasn't paid recently", General Trade, Forbes, p216, Nov. 1995.*
Babin, Charles E., "Dividends matter", General Trade, Forbes, p254, Jul. 1997.*
Kuhn, Susan E, "Stocks: Bear Market Ahead?", Fortune v130n13 pp: 48–51; Asian 32–35; European 30–33. Dec. 26, 1994.*
Keating, Peter, "The Money 30: forget the Dow: here's an index that tracks the future", Money (Money) v. 25 p. 79–82 +. Jun. 1996.*

* cited by examiner

*Primary Examiner*—Hani M. Kazimi
(74) *Attorney, Agent, or Firm*—Rothwell, Figg, Ernst & Manbeck

(57) ABSTRACT

A computer-implemented method and system for selecting stock equities for inclusion in a strategic investment portfolio includes identifying stocks making up a preselected index, and analyzing the stocks for dividends, earnings per share, earnings growth, market capitalization, and economic sector, according to predetermined criteria selected according to the investment strategy. A sorted list of acceptable stocks is then created from which the portfolio is assembled.

30 Claims, 2 Drawing Sheets

METHOD AND SYSTEM FOR CREATING A PORTFOLIO OF STOCK EQUITIES

BACKGROUND OF THE INVENTION

1. Field of the Invention

The present invention relates generally to computer-implemented methods and systems for performing analysis of information contained in a database according to a particular set of preselected parameters and obtaining a result based on such analysis. More particularly, the present invention relates to a computer-implemented method and system for creating a portfolio of stock equities by processing information contained in a database using a set of strategic factors so as to obtain a portfolio of strategically selected stocks reflecting a specific investment strategy.

2. Background and Conventional Art

In the securities field, financial analysts perform the task of following the operations and condition of companies whose common stock is sold to the public. Typically, in order to gain expertise, such analysts focus on particular economic sectors. Examples of such economic sectors are the entertainment sector, the personal services sector, the telecommunications sector, the automobile sector, and the information services sector.

An investor wishing to invest in stocks may purchase the stock of individual companies, or may purchase shares in mutual funds or units in an equity trust. While the potentially large gains from ownership of the stock of any one individual company are usually accompanied by an equally large risk of loss, investment in mutual funds or equity trusts seeks to reduce risk while maintaining a relatively high potential for gain.

Conventionally, the composition of an equity trust or mutual fund portfolio is a result of continuous analysis by many securities analysts employed by the mutual fund or sponsor of the equity trust. While the securities recommended for investment may be chosen based on an articulated objective, it is to be expected that a significant amount of subjectivity and divergence of opinion may arise in arriving at recommended securities for inclusion in the equity trust or mutual fund. Additionally, arriving at a consensus requires many hundreds of hours of human effort in collecting, reviewing, studying and analyzing information.

There thus exists a need in the art for a computer-implemented method and system for creating a portfolio of equities based on a specific strategy consisting of specifically defined parameters, and which can be implemented automatically and efficiently by analyzing information contained in a database in accordance with the predefined parameters to obtain an investment portfolio containing stocks satisfying the investment objective by meeting the requirements of the selected parameters.

SUMMARY OF THE INVENTION

The present invention solves the abovementioned need, by providing a computer-implemented method and system for creating a portfolio of stock equities for investment, based on an investment objective defined by specific preselected parameters.

In particular, according to one preferred embodiment, the invention provides a computer-implemented method for creating a portfolio of equity stocks, comprising the steps of determining the composition of a predetermined broadbased stock index by accessing a database and creating a list of the stocks making up said index; obtaining from said database for each stock in said index, data relating to at least earnings, dividend yield and the economic sector of the company issuing the stock; determining the composition of a narrower based stock index by accessing said database; creating an acceptable stock list by at least a) eliminating from said index list stocks having earnings below a predetermined earnings indicator, b) eliminating from said index list stocks which are part of said narrower based index, c) eliminating from said index list stocks which are in a predetermined economic sector, and d) placing the remaining stocks into a list of acceptable stocks; and sorting the acceptable list of stocks by dividend yield and placing into said portfolio, until a predetermined number of stocks are reached, a stock having the highest dividend yield of said remaining list, so long as the number of stocks in said portfolio from the same economic sector does not exceed a predetermined number.

According to other aspects of the invention, a computer-implemented system and a computer program product are provided for creating an investment portfolio in accordance with the features of the method described above.

BRIEF DESCRIPTION OF THE DRAWINGS

The present invention will become more fully understood from the following detailed description in conjunction with the accompanying drawings, in which.

DETAILED DESCRIPTION OF THE PREFERRED EMBODIMENTS

Figure 1:
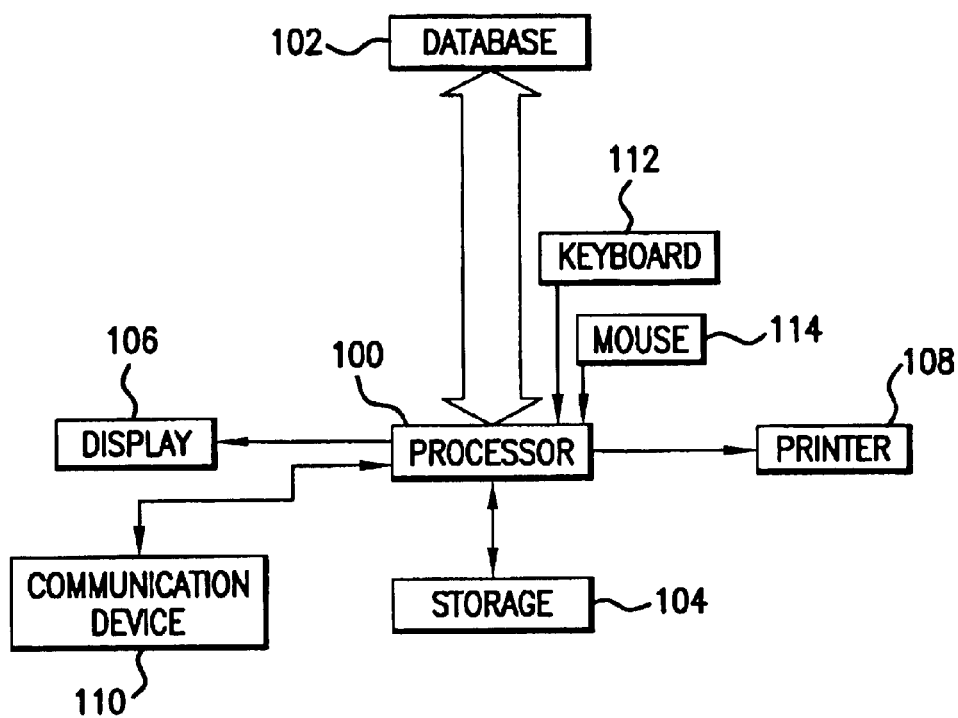
FIG. 1 is a block diagram of a computer system according to one preferred embodiment of the present invention.

Referring to FIG. 1, a computer-based system according to the present invention includes a data processor 100, a database 102, a storage medium 104 such as a floppy disk, a hard disk, a magnetic tape, an optical disk, or the like, a display 106 such as a CRT, a printer 108, and a communication device 110 such as a modem or network server. A keyboard 112 and mouse 114 input devices are also provided.

The storage 104 contains a computer program product containing computer-readable code which when loaded into the processor causes the processor to perform a process which creates an investment portfolio according to the method of the invention, which is described in detail below. Once the portfolio has been created, the results can be displayed on the display 106, printed on the printer 108, or communicated to a remote server, workstation or personal computer through communication device 110.

Figure 2:
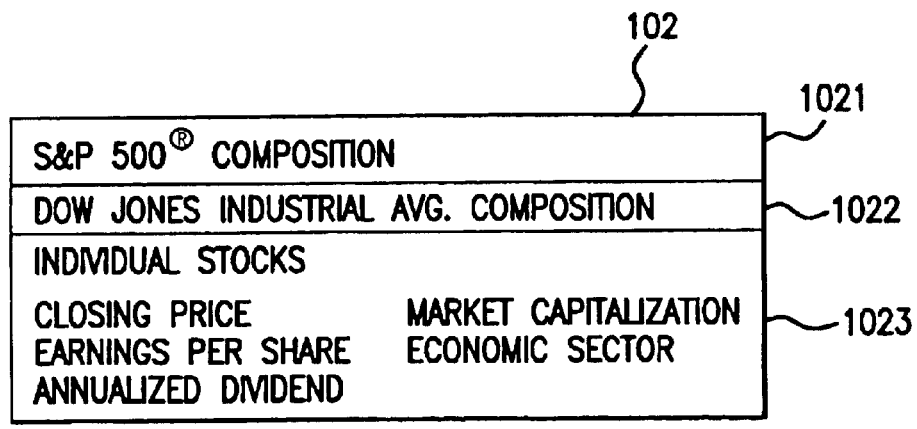
FIG. 2 is a diagram illustrating the composition of database 102 of FIG. 1.

FIG. 2 illustrates the structure of database 102 according to a preferred embodiment of the invention. The database contains a listing 1021 of the composition of the S&P 500®, a listing 1022 of the Dow Jones Industrial Average, and, for each individual stock listed, a record 1023 containing at least the latest closing price of the stock; the current earnings per share, as well as the earnings per share as of the previous 12, 24 and 36 months; the current annualized dividend, as well as the annualized dividend as of the previous 12, 24 and 36 months; the market capitalization of the company (which is equal to the closing price multiplied by the total number of outstanding shares); and the economic sector of the company.

Figure 3:
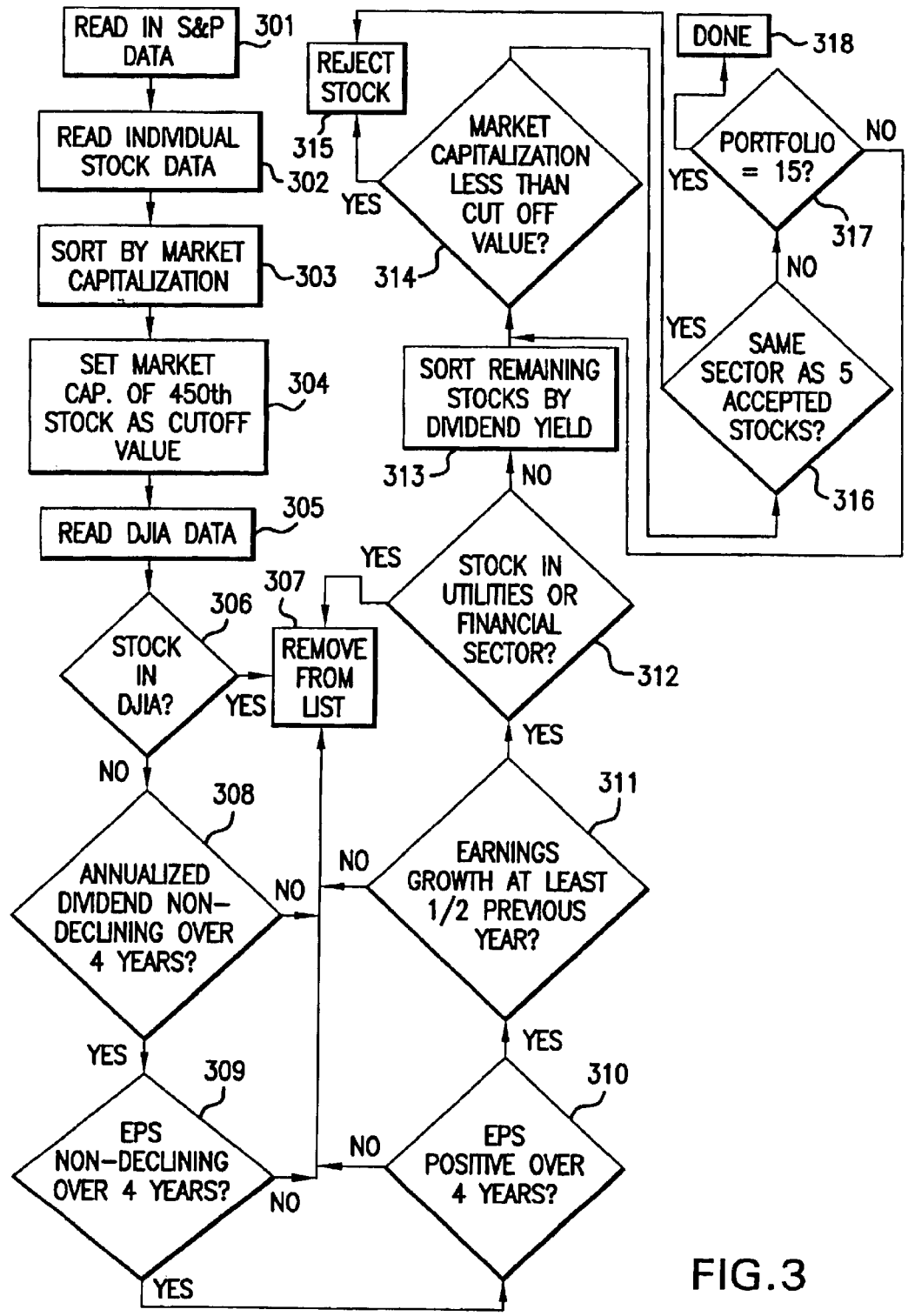
FIG. 3 is a flow diagram illustrating a computer-implemented method according to a preferred embodiment of the invention.

FIG. 3 illustrates a flow diagram of a preferred embodiment of a method according to the present invention. At step 301, the computer reads into memory the composition of the S&P 500 from list 1021, to create a running list of potential candidates for inclusion into the portfolio. At step 302, the individual stock data is read from record 1023 for each stock in the S&P 500. The method proceeds to step 303, wherein the market capitalization values of the 500 stocks are determined, and the stocks are sorted by market capitalization. At step 304, the market capitalization of the 450th stock is set as a cut-off value for accepting stocks into the portfolio. In particular, assuming all other criteria are met, a stock will not be accepted unless its market capitalization is at greater than the bottom 10 percent of the S&P 500.

At step 305, the composition of the Dow Jones Industrial Average (DJIA) is read from the database. At step 306, each stock in the DJIA is compared with the running list of stocks in memory. If a stock in the DJIA matches a stock in the running list, that stock is removed from the list at step 307. In this way, stocks in the DJIA are eliminated from consideration as part of the portfolio.

Next, at step 308 the annualized dividends for the past four years for each stock remaining in the running list are retrieved from database 102, and analyzed to determine whether they declined between any two 12 month periods over the past four 12 month periods. If so, the stock is removed from the running list at step 307. In this manner, only stocks having annualized dividends that did not decline over the last four years are considered for inclusion in the portfolio.

At step 309, the earnings per share (EPS) of each stock remaining in the running list are retrieved and analyzed to determine whether the EPS declined between any two 12 month periods over the last four years. If so, the stock is removed from the list at step 307. This step thus removes from consideration stocks which did not have at least constant earnings per share over the last four years. At step 310, the EPS for each year in the four year period is checked to determine whether it is positive or negative. If the EPS is negative for any 12 month period in the four year period, the stock is removed from the running list. Next, at step 311, the current EPS growth of each remaining stock is compared with its EPS growth from the previous 12 month period, and the stock is removed from the running list if its current EPS growth is not at least half of the growth for the previous 12 month period. For example, if the current EPS growth is 10%, the stock will be removed from the list if the EPS growth for the previous 12 month period was greater than 20%.

Next, the process advances to step 312, the economic sector of each remaining stock is examined to determine whether the stock is in the utilities (e.g., gas and electric) or financial (e.g., banking, insurance or brokerage) sectors. If so, the stock is removed from the running list at step 307.

At step 313, the remaining stocks in the running list are sorted by dividend yield (which is equal to the ratio of annualized dividend to closing price). At step 314, the market capitalization of the stock at the top of the list is compared with the previously determined cut-off value. If the market capitalization of the stock is less than the cut-off value, the stock is rejected at step 315.

At step 316, the economic sector of the stock is checked against the economic sectors of the stocks already placed in the portfolio (if any). If the economic sector of the stock is the same as the sector of five stocks already in the portfolio, it is rejected at step 315. In this way, no more than five stocks from any one economic sector are chosen for the portfolio.

At step 317, the stock is accepted, and the number of stocks in the portfolio is determined. If there are less than 15 stocks in the portfolio, the process returns to steps 314 and 316 where the next stock from the top of the list is examined for market capitalization and economic sector before being accepted into the portfolio. Once the portfolio reaches the preselected number (15 in the preferred embodiment), the process ends at step 318.

The completed portfolio then may be displayed on the display 106, printed out on printer 108, or communicated to remote servers, workstations or PCS through communication device 110, for appropriate transactional processing.

The invention having been thus disclosed, it will become apparent to those skilled in the art that the same may be varied in many ways without departing from the spirit and scope of the invention. Any and all such modifications are intended to be included within the scope of the following claims.

What is claimed is:

1. A computer-implemented method for creating a portfolio of equity stocks, comprising the steps of:

determining the composition of a predetermined broad-based stock index by accessing a database and creating a list of the stocks making up said index;

obtaining from said database for each stock in said index, data relating to at least earnings, dividend yield and the economic sector of the company issuing the stock;

determining the composition of a narrower based stock index by accessing said database;

creating an acceptable stock list by at least a) eliminating from said index list stocks having earnings below a predetermined earnings indicator, b) eliminating from said index list stocks which are part of said narrower based index, c) eliminating from said index list stocks which are in a predetermined economic sector, and d) placing the remaining stocks into a list of acceptable stocks; and sorting the acceptable list of stocks by dividend yield and placing into said portfolio, until a predetermined number of stocks are reached, a stock having the highest dividend yield of said remaining list, so long as the number of stocks in said portfolio from the same economic sector does not exceed a predetermined number.

2. The computer-implemented method of claim 1, wherein said creating step further includes the further step of eliminating from said index list stocks having a dividend yield below a predetermined yield indicator.

3. The computer-implemented method of claim 1, wherein the step of sorting and placing includes the further step of rejecting a stock having a market capitalization below a predetermined value.

4. The computer-implemented method of claim 1, wherein said predetermined earnings indicator is a non-declining earnings per share over a predetermined time period.

5. The computer-implemented method of claim 1, wherein said predetermined earnings indicator is a positive earnings per share over a predetermined time period.

6. The computer-implemented method of claim 1, wherein said predetermined earnings indicator is a non-declining earnings per share over a predetermined time period and a positive earnings per share over a predetermined time period.

7. The computer-implemented method of claim 2, wherein said predetermined yield indicator is a non-declining annualized yield over a predetermined time period.

8. The computer-implemented method of claim 1, wherein said broadbased stock index is the Standard & Poor's 500 Index.

9. The computer-implemented method of claim 1, wherein said narrower based stock index is the Dow Jones Industrial Average.

10. The computer-implemented method of claim 1, wherein said predetermined earnings indicator is an earnings growth of at least a predetermined factor of the previous year's earnings growth.

11. A computer-implemented system for creating a portfolio of equity stocks, comprising:

a database containing information pertaining to individual stocks, and information pertaining to the identity of stocks making up a plurality of known stock indexes;

means for determining the composition of a predetermined broadbased stock index by accessing said database and creating a list of the stocks making up said index;

means for obtaining from said database for each stock in said index, data relating to at least earnings, dividend yield and the economic sector of the company issuing the stock;

means for determining the composition of a narrower based stock index by accessing said database;

means for creating an acceptable stock list by at least
a) eliminating from said index list stocks having earnings below a predetermined earnings indicator,
b) eliminating from said index list stocks which are part of said narrower based index,
c) eliminating from said index list stocks which are in a predetermined economic sector, and
d) placing the remaining stocks into a list of acceptable stocks; and means for sorting the acceptable list of stocks by dividend yield and placing into said portfolio, until a predetermined number of stocks are reached, a stock having the highest dividend yield of said remaining list, so long as the number of stocks in said portfolio from the same economic sector does not exceed a predetermined number.

12. The computer-implemented system of claim 11, wherein said means for creating further includes means for eliminating from said index list stocks having a dividend yield below a predetermined yield indicator.

13. The computer-implemented system of claim 11, wherein said means for sorting and placing further includes means for rejecting a stock having a market capitalization below a predetermined value.

14. The computer-implemented system of claim 11, wherein said predetermined earnings indicator is a non-declining earnings per share over a predetermined time period.

15. The computer-implemented system of claim 11, wherein said predetermined earnings indicator is a positive earnings per share over a predetermined time period.

16. The computer-implemented system of claim 11, wherein said predetermined earnings indicator is a non-declining earnings per share over a predetermined time period and a positive earnings per share over a predetermined time period.

17. The computer-implemented system of claim 12, wherein said predetermined yield indicator is a non-declining annualized yield over a predetermined time period.

18. The computer-implemented system of claim 11, wherein said broadbased stock index is the Standard & Poor's 500 Index.

19. The computer-implemented system of claim 11, wherein said narrower based stock index is the Dow Jones Industrial Average.

20. The computer-implemented system of claim 11, wherein said predetermined earnings indicator is an earnings growth of at least a predetermined factor of the previous year's earnings growth.

21. A computer program product having computer-readable code stored on a computer-readable storage medium, said computer readable code comprising:

mean for determining the composition of a predetermined broadbased stock index by accessing a database and creating in a computer in which said code is programmed a list of the stocks making up said index;

means for obtaining from said database for each stock in said index, data relating to at least earnings, dividend yield and the economic sector of the company issuing the stock;

means for determining the composition of a narrower based stock index by accessing said database;

means for creating an acceptable stock list by at least
a) eliminating from said index list stocks having earnings below a predetermined earnings indicator,
b) eliminating from said index list stocks which are part of said narrower based index,
c) eliminating from said index list stocks which are in a predetermined economic sector, and
d) placing the remaining stocks into a list of acceptable stocks; and means for sorting the acceptable list of stocks by dividend yield and placing into said portfolio, until a predetermined number of stocks are reached, a stock having the highest dividend yield of said remaining list, so long as the number of stocks in said portfolio from the same economic sector does not exceed a predetermined number.

22. The computer program product of claim 21, wherein said means for creating further includes means for eliminating from said index list stocks having a dividend yield below a predetermined yield indicator.

23. The computer program product of claim 21, wherein said means for sorting and placing further includes means for rejecting a stock having a market capitalization below a predetermined value.

24. The computer program product of claim 21, wherein said predetermined earnings indicator is a non-declining earnings per share over a predetermined time period.

25. The computer program product of claim 21, wherein said predetermined earnings indicator is a positive earnings per share over a predetermined time period.

26. The computer program product of claim 21, wherein said predetermined earnings indicator is a non-declining earnings per share over a predetermined time period and a positive earnings per share over a predetermined time period.

27. The computer program product of claim 22, wherein said predetermined yield indicator is a non-declining annualized yield over a predetermined time period.

28. The computer program product of claim 21, wherein said broadbased stock index is the Standard & Poor's 500 Index.

29. The computer program product of claim 21, wherein said narrower based stock index is the Dow Jones Industrial Average.

30. The computer program product of claim 21, wherein said predetermined earnings indicator is an earnings growth of at least a predetermined factor of the previous year's earnings growth.

* * * * *